United States Patent
Usui et al.

(10) Patent No.: US 7,590,348 B2
(45) Date of Patent: Sep. 15, 2009

(54) PHOTOGRAPHING APPARATUS

(75) Inventors: Tsutomu Usui, Tokyo (JP); Hirotomo Sai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 263 days.

(21) Appl. No.: 11/638,243

(22) Filed: Dec. 12, 2006

(65) Prior Publication Data

US 2007/0153086 A1 Jul. 5, 2007

(30) Foreign Application Priority Data

Dec. 16, 2005 (JP) ............................ 2005-362595

(51) Int. Cl.
*G03B 41/00* (2006.01)
(52) U.S. Cl. .................. 396/332; 396/322; 348/218.1
(58) Field of Classification Search ................ 396/322, 396/325, 332, 333; 348/28, 47–48, 218.1, 348/262, 264
See application file for complete search history.

(56) References Cited

U.S. PATENT DOCUMENTS

| | | | | |
|---|---|---|---|---|
| 5,657,073 A * | 8/1997 | Henley | | 348/38 |
| 6,788,333 B1 * | 9/2004 | Uyttendaele et al. | | 348/36 |
| 6,813,391 B1 * | 11/2004 | Uyttendaele et al. | | 382/284 |
| 6,822,563 B2 * | 11/2004 | Bos et al. | | 340/461 |
| 6,943,829 B2 * | 9/2005 | Endo et al. | | 348/207.11 |
| 7,015,954 B1 * | 3/2006 | Foote et al. | | 348/218.1 |
| 7,076,116 B2 * | 7/2006 | Horie | | 382/284 |
| 7,197,192 B2 * | 3/2007 | Edwards | | 382/284 |
| 7,239,805 B2 * | 7/2007 | Uyttendaele et al. | | 396/222 |
| 7,428,019 B2 * | 9/2008 | Irani et al. | | 348/581 |
| 2003/0133019 A1 * | 7/2003 | Higurashi et al. | | 348/218.1 |
| 2004/0212688 A1 * | 10/2004 | Takano et al. | | 348/218.1 |

FOREIGN PATENT DOCUMENTS

| | | |
|---|---|---|
| JP | 11-277231 | 10/1999 |
| JP | 2002-135649 | 5/2002 |
| JP | 2002-135787 | 5/2002 |
| JP | 2002-142150 | 5/2002 |
| JP | 2003-163831 | 6/2003 |
| JP | 2004-096488 | 3/2004 |

* cited by examiner

*Primary Examiner*—W B Perkey
*Assistant Examiner*—Bret Adams
(74) *Attorney, Agent, or Firm*—Townsend and Townsend and Crew LLP

(57) ABSTRACT

A photographing apparatuses, enabling to keep dynamic resolution, as well as, to obtain an image being wide in dynamic range, with using a plural number of cameras therein, and further enabling to photograph a further wider range, comprises: a plural number of photographing devices overlapping photographing regions thereof with each other; a brightness distribution detecting portion for detecting brightness levels of image signals, which are photographed by means of the plural number of photographing devices; an area determining portion for determining an area where the brightness level detected by the brightness distribution detecting portion is appropriate, among photographing regions overlapping with each other, in relation with the image signals photographed by the plural number of photographing devices; and a synthesizing portion for synthesizing the image signals photographed by the plural number of photographing devices, with using the image signal of the area, the brightness level of which is determined to be appropriate in the area determining portion, among the image signals photographed by the plural number of photographing devices, in relation with the photographing regions overlapping with each other.

5 Claims, 4 Drawing Sheets

PHOTOGRAPHING APPARATUS

CLAIM OF PRIORITY

The present application claims priority from Japanese application serial no. JP 2005-362595, filed on Dec. 16, 2005, the content of which is hereby incorporated by reference into this application.

BACKGROUND OF THE INVENTION

1. Field of the Invention

The present invention relates to a photographing apparatus.

2. Description of the Related Art

As a background art of the present technical field is already known in Patent Document 1, i.e., Japanese Patent Laying-Open No. 2002-135649 (2002), for example. In said Patent Document, describing "to conduct composing or synthesizing a long-time exposure signal and a short-time exposure signal, while maintaining gradation of each exposure signal" as a problem to be dissolved, there is described, "switching over the characteristics of a gamma (γ) processing circuit with a long-time exposure signal and a short-time exposure signal any time, so as to conduct a process suitable to each exposure, and thereby conducting composing or synthesizing a long-time exposure signal and a short-time exposure signal", as a means for dissolving thereof.

As other background art of the present technical field is already known in Patent Document 2, i.e., Japanese Patent Laying-Open No. 2004-96488 (2004), for example. In said Patent Document, describing "to acknowledge the details of an object, correctly, even when the difference in brightness thereof is large, while decreasing an omission of detecting the object by means of an object detecting apparatus for observing a predetermine area or region", as a problem to be dissolved, there is described, "an observation area is photographed with using "n" sets of cameras 201, differing in the light exposure thereof, thereby detecting an object entering into the observation area while conducting a stereo picture process onto pictures, which are photographed by the "n" sets of cameras 201, and in case when detecting an object entering into the observation area, a picture being wide in dynamic range is composed or synthesized by taking out picture portions, each of which is appropriate in the light exposure, and thereby acknowledging the details of the object with using that composed or synthesized picture", as a means for dissolving thereof.

Further, as other background art, there is also Patent Document 3, i.e., Japanese Patent Laying-Open No. Hei 11-277231 (1999), for example. In said Patent Document, describing "a weld monitoring apparatus for always providing a weld image, which can be easily adjusted on an amount of light onto a plural number of photographing apparatuses and on the optical axis of the photographing apparatuses", there is described, "a welding monitoring apparatus, for photographing a weld torch portion with setting a high-shading filter 24 to a first photographing apparatus 2, while taking picture of a molten poor and/or a groove or bevel portion while exposing to light up to a portion, which is relatively low in the brightness, by means of a second photographing apparatus 3, and deleting the weld torch portion among a screen of the second photographing apparatus, thereby displaying a synthesized or composed image formed by inserting there with that weld torch portion, which is obtained by the first photographing apparatus, being characterized in that the photographing apparatuses 2 and 3 comprise members for adjusting an amount of light transmission, such as, liquid crystal filters 23 and 33, which can change a receiving amount of light upon electric signals, and/or electronic shutters, etc., thereby electrically adjusting an amount of transmitting lights", as a means for dissolving thereof.

SUMMARY OF THE INVENTION

With a video camera or an electronic still camera, when conducting a general exposure control, in particular, in case when taking a picture against the light, such as, taking a picture of a person near a window from an inside of a room, for example, the person of an object is defaced dark, but fitting the exposure to scenery outside the window. In case when taking such a picture of a scene having a wide dynamic range, a backlight compensation process is executed to compensate so that the image signal of the objected person does not deface dark. However, execution of such the compensation blows out the scenery outside the room white, which was optimal before that backlight compensation. Thus, the backlight compensation is a exposure process of bringing an iris of the camera to be open a little bit wide, comparing to the normal one, or setting the exposure time to be longer, thereby photographing an area, which is defaced black inherently, to be bright. Also, for the observation camera or the like, in case when it is necessary to observe both an indoor and an outdoor of the room, simultaneously, by means of one (1) set of camera, it takes a picture at a point of agreement on the exposures for the indoor and the outdoor.

In case when taking such a scene necessitating the wide dynamic range as was mentioned above, there is a strong tendency of dividing the distribution of brightness into two opposites (or multi-opposites), i.e., low brightness portion/high brightness portion, when photographing against the light, and there are many cases where a ratio is low on the screen, of portions presenting a level of intermediate brightness.

In this manner, when taking a picture of the scene, including such the areas, which largely differ from in the brightness levels, there is already known a technology of obtaining an image of wide dynamic range, wherein a video signal, which is obtained by taking a picture of a photographing target area of low brightness, and a video signal, which is obtained by taking a picture of a photographing target area of high brightness, are conducted with the exposure controls different from each other, separately, and the such signals controlled in this manner are added to, thereby achieving the backlight compensation thereon.

Within the technology described in the Patent Document 1, photographing is made with a long-time exposure fitting to a photographing target of low brightness and short-time exposure fitting to a photographing target of high brightness, by changing exposure time of the camera for each one (1) field, and a gamma (γ) compensation is conducted upon each of the signal which is photographed by the short-time exposure and the signal which is photographed by the long-time exposure, with gamma (γ) characteristics different from each other. Thereafter, the long-time exposure signal and the short-time exposure signal are fitted to the timing thereof, to be added to each other.

However, with such the method of conducting the exposure control upon each field and adding the photographed image of the each field to each other, by means of one (1) set of the camera, as is shown in the technology described in the Patent Document 1, the frame rate of an image after adding the photographed signals comes down to a half (½) of the frame rate under the condition of not conducting such the control as was mentioned above thereon, and there is a drawback that dynamic resolution is low, in particular, in case of a camera mounted on the car or automobile (i.e., an on-vehicle camera) requiring the high frame rate, for example. Further, in case when photographing the same angle of field by a plural number of cameras, i.e., by one set of camera with the long-time exposure, and by other set with the short-time exposure, since the angle of field of them is same to that of one set of the camera; therefore, it is impossible to cover the photographing over a wide range, and it raises up the cost per each photographing range.

Then, for dissolving such the drawbacks, there is required capacity or performance of keeping the dynamic resolution and also obtaining an image being wide in the dynamic range, and thereby enabling to photograph a further wide range, with using a plural number of cameras, in particular, in case when photographing a wide scene by means of a camera, upon which the dynamic range is required, such as, the on-vehicle camera or the like, for example.

An object according to the present invention is to accomplish an improvement of the capacity or performance of the photographing apparatus.

The object mentioned above is accomplished by the invention described in the appending claims.

BRIEF DESCRIPTION OF THE DRAWINGS

Those and other features, objects and advantages of the present invention will become more apparent from the following description when taken in conjunction with the accompanying drawings wherein.

DETAILED DESCRIPTION OF THE INVENTION

Figure 1:
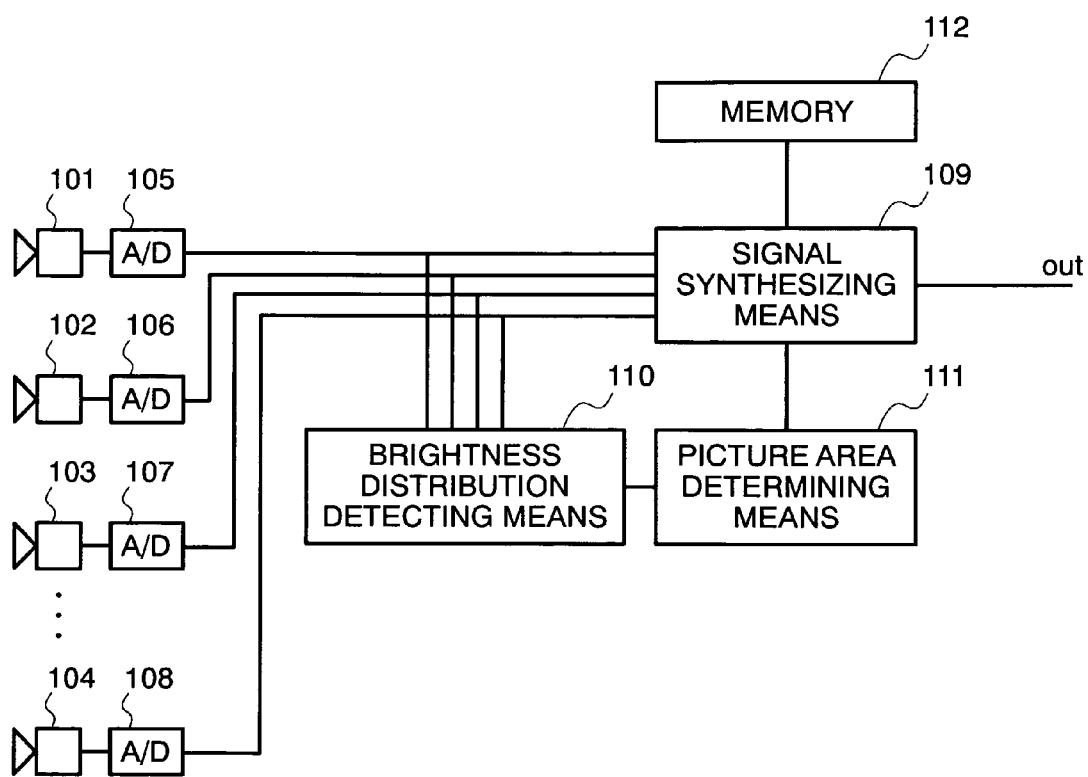
FIG. 1 is a block diagram for showing a first embodiment of an image signal processing apparatus, according to the present invention.

First of all, main reference numerals to be used within drawings:

101: a photographing apparatus;
102: a photographing apparatus;
103: a photographing apparatus;
104: a photographing apparatus;
105: an A/D covering means;
106: an A/D covering means;
107: an A/D covering means;
108: an A/D covering means;
109: a video signal synthesizing process means;
110: an image signal brightness level detection means;
111: an image signal brightness level determining means;
112: a memory;
201: a car;
202: a central photographing apparatus;
203: a left-hand side photographing apparatus;
204: a right-hand side photographing apparatus;
205: a photographing area of the central photographing apparatus;
206: a photographing area of the left-hand side photographing apparatus;
207: a photographing area of the right-hand side photographing apparatus;
208: an irradiation area of a headlight;
209: a pedestrian;
210: a pedestrian;
211: a car (a car running in the opposite direction);
212: an irradiation area of a headlight;
301: a video signal by means of the central photographing apparatus;
302: a video signal by means of the left-hand side photographing apparatus;
303: a video signal by means of the right-hand side photographing apparatus;
304: a synthesized image signal;
401: a video signal by means of the central photographing apparatus;
402: a video signal by means of the left-hand side photographing apparatus;
403: a video signal by means of the right-hand side photographing apparatus, which is less in exposure control comparing to the central photographing apparatus; and
404: a synthesized image signal.

Hereinafter, embodiments according to the present invention will be fully explained by referring to the attached drawings.

FIG. 1 is a block diagram for showing a first embodiment of a stereo apparatus, according to the present invention.

Reference numerals 101 to 104 depict one (1) or more photographing apparatuses or elements, respectively; 105 to 108 an A/D converter means; 109 a signal synthesizing means; 110 a brightness distribution detecting means; 111 a picture area determining means; and 112 a memory.

Figure 2:
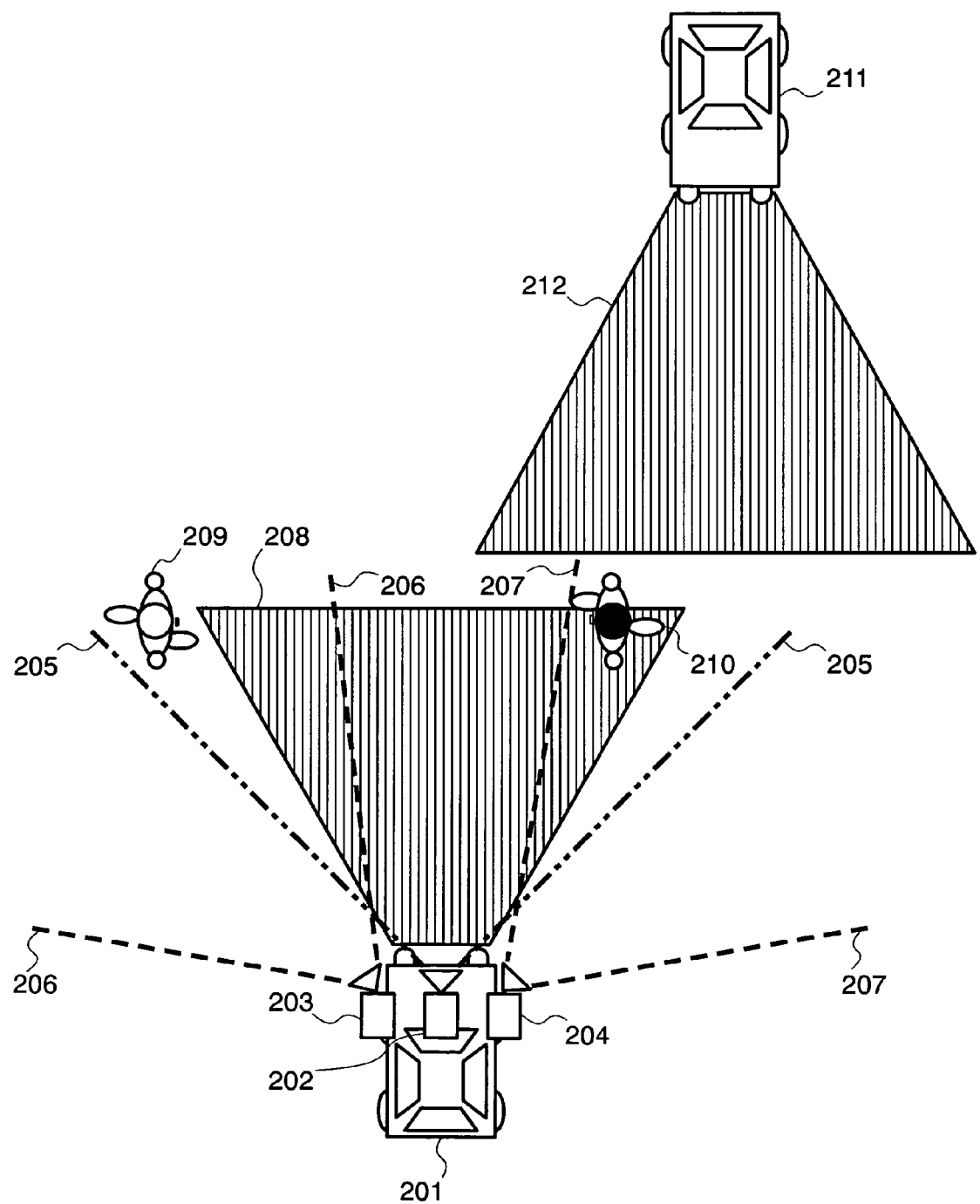
FIG. 2 is a view for showing an example of adoption of image signal processing apparatus, according to the present invention.

FIG. 2 is a view for showing a situation under condition where there is a car running in the opposite direction while irradiating the headlights thereof, in the night or the like, according to a first embodiment.

A reference numeral 201 depicts a self-car; 202 to 204 the photographing apparatuses; 205 a two-dotted chained line depicting an angle of field of the photographing apparatus for photographing the front of the self-car; 206 a chained line depicting an angle of field of the photographing apparatus for photographing the front on left-hand side of the self-car; 207 a chained line depicting an angle of field of the photographing apparatus for photographing the front on right-hand side of the self-car; 208 an irradiating range of the self-car, being treated with slanted lines; 209 and 210 positions of the pedestrians, 211 the car running in the opposite direction, and 212 an irradiating range of the car running in the opposite direction, being treated with slanted lines, respectively.

Figure 3:
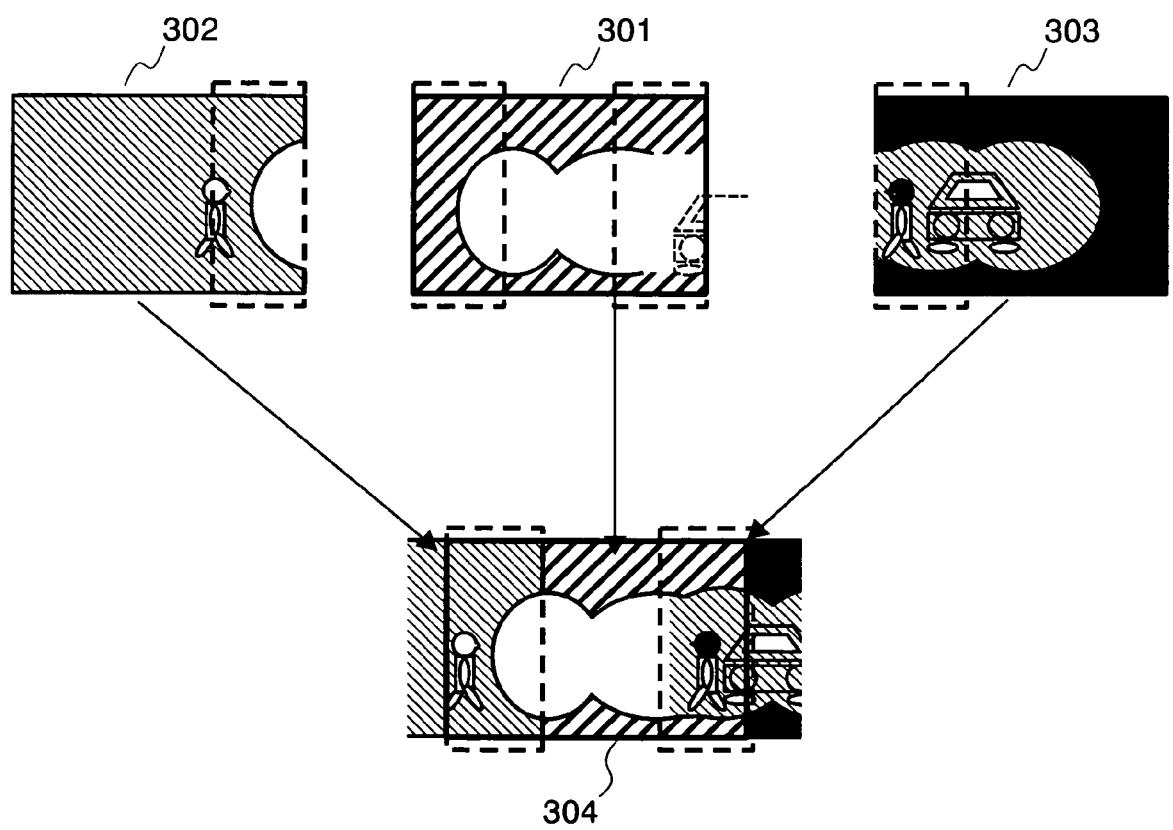
FIG. 3 is a view for showing photographed images and an after-synthesized image thereof, by the image signal processing apparatus.

FIG. 3 is a view for showing an image composing or synthesizing method with using the photographing result by means of the on-vehicle camera, under the condition shown in FIG. 2, and the result of composing or synthesizing the images.

A reference numeral 301 depicts an image obtained by the photographing apparatus photographing the front of the self-car; 302 an image obtained by the photographing apparatus photographing the front on the left-hand side of the self-car; 303 an image obtained by the photographing apparatus photographing the front on the right-hand side of the self-car; and 304 an image after composing or synthesizing the images 301 through 303, respectively. Also, portion of broken lines of each image indicate overlap portions of the images obtained by each of the photographing apparatuses.

In FIG. 1, the video signals, which are obtained through photoelectric conversion by the photographing elements 101 through 104 are inputted into the signal synthesizing means 109 and the brightness (level) distribution detecting means 110. The signal synthesizing means 109 is able to synthesize the video signal inputted from the each photographing elements or apparatus, for each region, arbitrarily. Also, in the similar manner to the signal synthesizing means, the brightness (level) distribution detecting means 110 is able to detect the distribution of brightness within a screen photographed by each of the photographing apparatuses, with using the video signal inputted from the each photographing apparatus.

The picture area determining means 111 is able to determine and detect an appropriate exposure potion where an object can be easily acknowledged, among the video signals obtained from the of brightness level, which is obtained by the brightness (level) distribution detecting means 110.

In FIG. 2, the car 201 comprises three (3) sets of photographing apparatuses 202 through 204, and those photographing apparatuses take pictures the front, the front on the left-hand side, and the front on the right-hand side of the car, respectively. The photographing apparatus 202 takes the picture of a front-central direction of the car, and the chained line 205 on FIG. 2 shows the region of photographing thereof. The photographing apparatus 203 takes the picture of the front of the car 201, but on the left-hand side, and the chained line 206 on FIG. 2 shows the region of photographing thereof. The photographing apparatus 204 takes the picture of the right-hand side of the car 201, and the chained line 207 on FIG. 2 shows the region of photographing thereof. The chained line 208 depicts the region or area of irradiation by the headlamps of the car 201.

Also, it is assumed that a person walking outside the irradiation region 208 of the car 201 is a pedestrian 209, and a person walking inside the irradiation region the same is a pedestrian 210. Further, in the similar manner to the car running in the opposite direction of the car 201, the chained line 212 shows the irradiation region by the headlights of the car 211. And, it is assumed that the pedestrian 210 is within the irradiation region of both the car 201 and the car 211.

FIG. 3 shows the pictures 301 to 303 photographed by the photographing apparatuses 202 to 204 shown in FIG. 2, which are provided on the car 1 and a composed or synthesized picture 304.

First of all, the picture at the front of the car, which is photographed by the photographing apparatus 202, is as shown by the picture 301 in the figure. This includes a portion irradiated by the light of the car 201 itself, and portion not irradiated by the light, in the angle of field by the photographing apparatus 202, and an averaged level of brightness is around a middle one; therefore, as a result of exposure control in this angle of field, the portion where the light is irradiated by the light is a little bit over in the exposure, while the portion where no light is irradiated is a little bit under in the exposure, in the exposure control. Also, since the exposure of the pedestrian 210 is a little bit over, it is difficult to see her/him due to the whiteout phenomenon by the headlights of the car running in the opposite direction.

Next, the picture on at the front of the left-hand side self-car photographed by means of the photographing apparatus 203 is as shown by the picture 302. This picture 302 is mainly constructed with the portion, which is not irradiated by the headlights, and an averaged level of brightness is low; therefore, as a result of the exposure control on this picture 302, the exposure is over in the head-lighted portion, comparing to the picture 301, while the exposure of portions other than that is appropriate. Also, since the pedestrian 208 in the picture 302 is appropriate, it is possible to acknowledge her/him.

Further, the picture at the front of the right-hand side of the self-car photographed by means of the photographing apparatus 204 is as shown by the picture 303. This is because the picture 303 receiving the direct irradiation of the headlights of the car running in the opposite direction is high in the averaged level of brightness, and therefore as the result of the exposure control at this angle of field, the exposure is appropriate in a portion irradiated by the headlights of the self-car, comparing to the picture 301, while it is under exposure in other portion(s). Although the pedestrian 210 is standing at the position of backlight with respect to the headlights, however since the exposure is appropriate of the pedestrian 210 on the picture 303, it is possible to acknowledge the pedestrian 210 on the picture 303 comparing to the pedestrian 210 on the picture 301.

When composing or synthesizing one (1) piece of a synthesized image signal with using those plural numbers of image signals, in particular, within the portion where the picture 301 by means of the photographing apparatus 202 overlaps with the picture 302 by means of the photographing apparatus 203, a portion where no headlight irradiates on the picture 301 is composed or synthesized by a picture of the portion on the picture 302, being in the same area, where no headlight irradiates on the picture 302, and also in the similar manner, within the portion where the picture 301 by means of the photographing apparatus 202 overlaps with the picture 303 by means of the photographing apparatus 204, a portion where the headlights irradiate on the picture 301 is composed or synthesized by a picture of the portion on the picture 303, also being in the same area, where the headlights irradiate on the picture 301; thereby enabling to obtain a composed or synthesized picture, as is shown by the picture 304 in FIG. 3.

In this manner, producing such the composed or synthesized picture brings the dark portion where no headlight irradiates, and the portion which cannot be seen due to the whiteout by the headlights of the car running in the opposite direction, etc., i.e., being invisible portions, conventionally, to be appropriate in the exposure thereof, according toe the present embodiment; therefore, it is possible to acknowledge the pedestrians 209 and 210 or the like, even in case where it is difficult to acknowledge for eyes of the human being.

Figure 4:
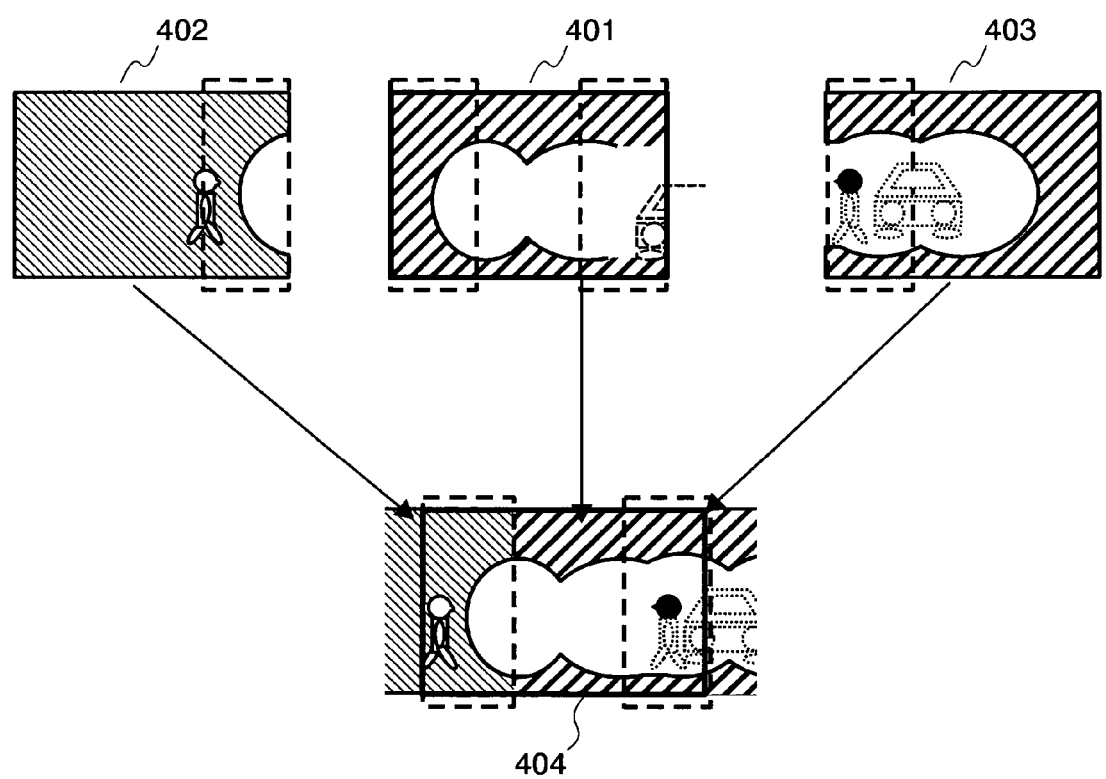
FIG. 4. is also a view for showing photographed images and an after-synthesized image thereof, by the image signal processing apparatus.

Next, FIG. 4 shows the pictures 401 to 403 and the composed or synthesized picture 404 thereof, in particular, in case when photographing the pictures by means of the photographing apparatuses 202 to 204, which are provided on the self-car 201 shown in FIG. 2, in the similar manner to that shown in FIG. 3.

As is shown in this FIG. 4, even if there is an overlapping portion for each of the photographing apparatuses, it is impossible to obtain a picture, being wide in dynamic range, with such the composed or synthesized picture in the case when conducting the exposure control at the same level for each of the photographing apparatuses.

Then, the control for each of the photographing apparatuses is conducted depending upon the respective brightness level, so that a difference is brought about in the exposure control; thereby enabling to obtain the picture, being wide in dynamic range, such as, the picture 304 as shown in FIG. 3.

Also, in case where there is/are the car running in the opposite direction and/or the pedestrian, etc., within range of the picture, and/or case where the control is conducted so as to bring about the difference in the exposure control, each of the photographing apparatuses conducts such the control on itself that the overlapping portions come to be much more with the others, in the direction of photographing; thereby enabling to obtain much region, where a wide dynamic range can be obtained.

It is also possible to input the analog signals from the photographing apparatuses into the signal synthesizing means and the brightness distribution detecting means.

According to the present invention, it is possible to improve the performances of the photographing apparatus.

While we have shown and described several embodiments in accordance with our invention, it should be understood that disclosed embodiments are susceptible to changes and modifications without departing from the scope of the invention. Therefore, we do not intend to bound by the details shown and described herein but intend to cover all such changes and modifications as fall within the ambit of the appended claims.

What is claimed is:

1. A photographing apparatus, comprising:
   a plural number of photographing devices, each photographing device having a photographing region, a part of the photographing region of at least one of the photographing devices overlaps a portion of photographing region(s) of other photographing device(s);
   a brightness distribution detecting portion, which is configured to detect brightness levels of image signals, which are photographed by means of the plural number of photographing devices;
   an area determining portion configured to determine an area where the brightness level is appropriate from among photographing regions overlapping each other, in relation with the image signals photographed by said plural number of photographing devices; and
   a synthesizing portion configured to synthesize the image signals photographed by said plural number of photographing devices using the image signal of the area and the brightness level of the area which is determined to be appropriate by said area determining portion,
   wherein when the photographic devices are capturing images and there is a difference in brightness levels among the image signals in captured images, then the photographic devices are controlled such that an exposure setting of at least one photographic device is set to be greater than an exposure setting of at least another photographic device.

2. The photographing apparatus, as described in claim 1, wherein said area determining portion
   detects the brightness levels of the photographing regions overlapping with each other, by means of said brightness distribution detecting portion, from among the images photographed by the respective photographing devices; and
   selects, within areas where the brightness level detected is lower or higher than an appropriate brightness level, an image of the photographing device which is appropriate in the averaged brightness level thereof, among the image signals photographed by the respective photographing devices.

3. The photographing apparatus, as described in the claim 1, wherein said synthesizing portion synthesizes the image signals photographed by the respective photographing devices, for each of the areas selected by said area determining portion.

4. The photographing apparatus, as described in the claim 1, wherein said photographing devices change directions thereof, respectively, so that the photographed regions overlapping with each other comes to be large, in case when conducting such control that the difference in the exposure comes to be large through the exposure control of the ach of the photographing devices.

5. The photographing apparatus, as described in the claim 1, wherein said photographing devices change directions thereof, respectively, so that the photographed regions overlapping with each other comes to be large, in case when there is a car running in opposite direction and/or a pedestrian within each of the photographing regions thereof.

* * * * *